INVENTOR.
RALPH R. HAUSE

INVENTOR.
RALPH R. HAUSE
BY Evans & Pearne
ATTORNEYS

May 19, 1959 R. R. HAUSE 2,887,344
MACHINE TOOL SPINDLE MOUNTING MEANS
Filed April 9, 1958 5 Sheets-Sheet 3

INVENTOR.
RALPH R. HAUSE
BY *Evans & Pearne*
ATTORNEYS

INVENTOR.
RALPH R. HAUSE
BY Evans & Dearne
ATTORNEYS

May 19, 1959 R. R. HAUSE 2,887,344
MACHINE TOOL SPINDLE MOUNTING MEANS
Filed April 9, 1958 5 Sheets-Sheet 5

INVENTOR.
RALPH R. HAUSE
BY Evans & Fearing
ATTORNEYS

United States Patent Office 2,887,344
Patented May 19, 1959

2,887,344

MACHINE TOOL SPINDLE MOUNTING MEANS

Ralph R. Hause, Montpelier, Ohio

Application April 9, 1958, Serial No. 727,437

6 Claims. (Cl. 308—6)

This invention relates to machine tools and particularly to improvements in machine tools for high-speed boring and analogous turning operations. Reference is made to my application Serial No. 652,850, filed April 15, 1957 (now abandoned) of which this application is a continuation-in-part.

The invention pertains to that class of apparatus which accomplishes high-speed boring and which is also capable of rapid feed and return strokes but which class of apparatus does not involve the more conventional heavy quill mounting structure and heavy and costly over-all design, which heavy design is generally required for machines capable of the above combination of movements. This broad class of apparatus involves the use of a ball bearing sleeve which journals the stroking tool spindle in an outer race or casing and in which positively coupled linkage means is provided to stroke the sleeve at half the rate of the spindle to prevent roving of the sleeve (resulting in relatively gross inaccuracies) while at the same time maintaining as faithfully as possible a true rolling contact between the ball bearings and the spindle and casing or outer race. Another example of machine tool structure which pertains to the same broad class of apparatus is disclosed in U.S. Patent 2,655,414.

An object of the present invention is to provide machine tools belonging to the same above-mentioned broad class of apparatus but which structurally differ from the prior art in a manner which increases the period of maintenance-free service of the machines' bearings.

Another object of the invention is to achieve improved diametral repeatability on precision boring and turning operations.

Conventional machine tools may be adapted to the inclusion of the invention or new specially designed equipment may embody the invention. The invention may be employed in association with vertically, horizontally or angularly mounted axially movable spindles.

Axial movement, or more specifically, axial translation, is generally referred to herein as "stroking."

The invention contemplates a ball bearing retainer sleeve which is linked to the stroking of the spindle by a stroking member which surrounds the spindle and carries one or preferably two or more pinions or spur gears which interengage both a quill-mounted rack and a casing-mounted rack.

The above and other aspects of the invention are more concretely set forth in the following description of embodiments of the invention. This description is given merely by way of example and the practice of the invention does not necessarily call for the practice of every particular of this description.

In the accompanying drawings.

Figure 1:
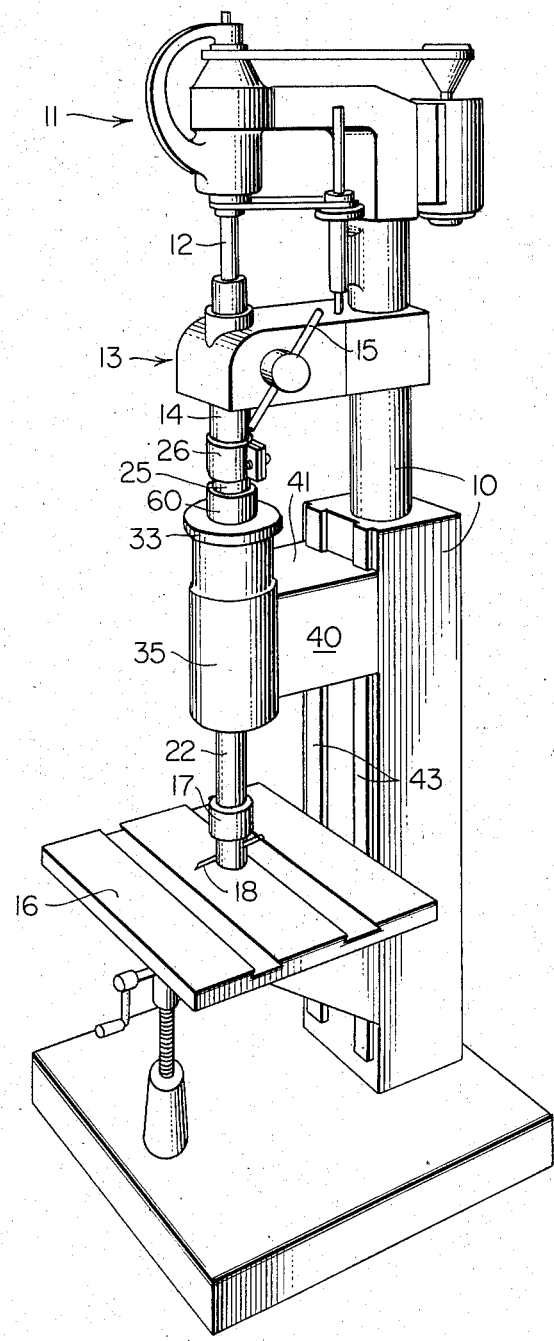
Figure 1 is a view in perspective of a machine tool with an embodiment of the invention incorporated therein.
Figure 2:
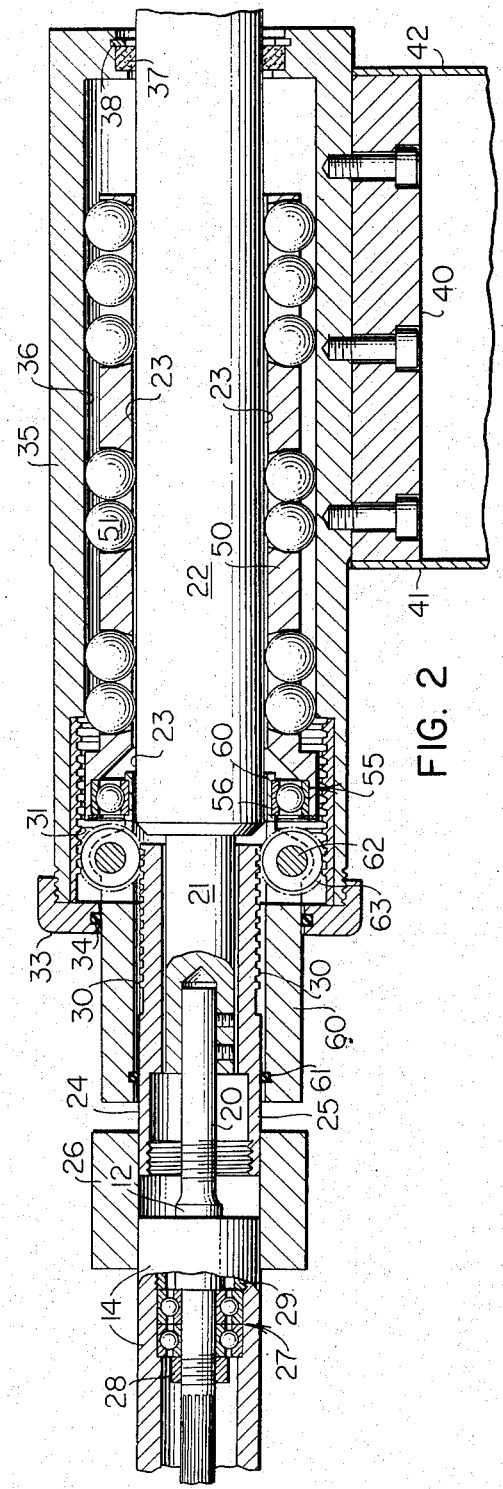
Figure 2 is a cross-sectional view through the casing for the ball retainer sleeve, which casing is shown in Figure 1, and through immediately adjacent portions of the apparatus.
Figure 3:
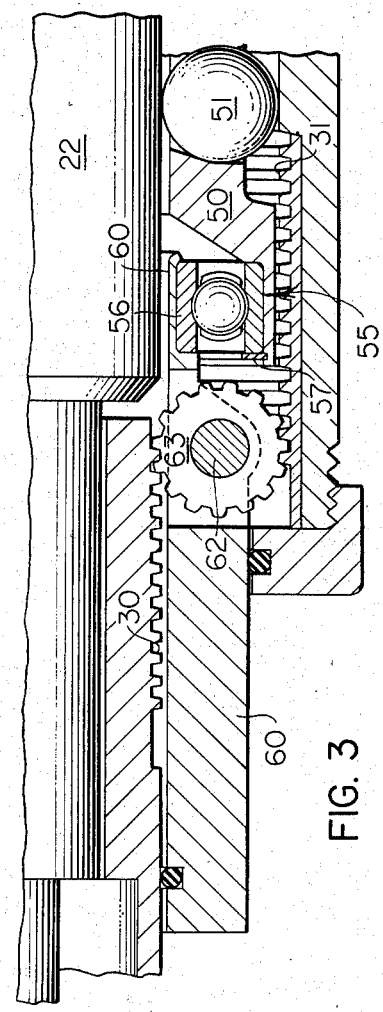
Figure 3 is an enlarged fragmentary view of a portion of the apparatus seen in Figure 2.

The drawings illustrate the invention in connection with a drill press type of machine tool which may in fact comprise a conventional type of drill press modified to incorporate the invention. The machine illustrated includes a column 10 which supports a power head 11. Depending from the power head is a spindle 12. Below the power head is located a quill head 13 which supports a vertically adjustable quill 14. The quill 14 is adjustable by manipulation of the hand feed lever 15 and by customary power feeds, the controls for which may be located on the opposite side of the head 13, to provide longitudinal feed of the spindle 12. The spindle 12 is received in the quill 14 in the usual manner and, in the particular example illustrated, the lower end of the spindle 12 projects out from the bottom of the quill 14 and is reduced at its lowermost end 20, as seen in Figure 2. The end 20 is received in and coupled to a spindle stub 21 which is integral with the lower spindle portion 22 on which is turned the spindle bearing surface 23. The lower end of the lower spindle portion 22 depends toward an adjustable work-supporting table 16 and receives a tool holder 17 in which a boring tool 18 or other appropriate tool is held.

Stroking movement of the quill may be transmitted to the spindle through a thrust bearing by any ordinary means. In the apparatus illustrated in Figures 1–6 there is provided a bearing generally indicated by the reference numeral 27, the inner race being clamped by a bearing nut 28 and the outer race being clamped by a clamping sleeve 29.

The quill also has a lower extension in the illustrated example of the invention, which extension is indicated by the reference numeral 25. Formed on the quill portion 25 in fixed association therewith is an axially extending rack 30, the teeth of which extend annularly around the structure. Also formed on the quill portion 25 is a quill bearing or sealing surface 24. The quill portion 25 is coupled to the upper quill portion 14 by means of a collar clamp 26.

Surrounding the spindle portion 22 is an outer race or casing member 35 which has the outer race or bearing surface 36 turned therein. A removable sleeve having a rack 31 formed therein is received in the upper end of the member 35 and is retained in place by the removable end cap 33 which threadedly engages the outside of the member 35 and which may carry a suitable sealing ring 34. The lower end of the member 35 is also sealed against foreign matter by suitable means such as the sealing member 37 which is retained by a snap ring 38.

The member 35 is supported on a hollow casting 40 which has top and bottom covers 41 and 42 and which is itself adjustably bolted to the lower portion of the column 10 and in engagement with the slideways or tracks 43. Received in the member 35 is a ball retainer sleeve 50 which surrounds the spindle 22. A plurality of balls 51 are suported in the ball retainer sleeve 50 and are in bearing engagement with the spindle bearing surface 23 and the outer race or bearing surface 36.

Located above the sleeve 50 is a pinion-carrying member 60 which may be provided at one end with a suitable sealing ring 61 which coacts in sealing relationship with the surface 24. The outer surface of the member 60 coacts in sealing relationship with the sealing ring 34. Fixed on the member 60 are one or more journal pins 62 which support the associated pinions 63. It is preferable that at least two diametrically opposed pinions be provided. The pinions engage the racks 30 and 31.

Figure 4:
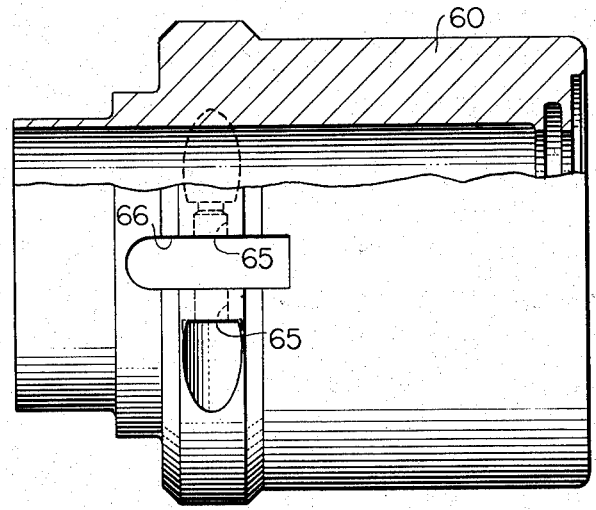
Figure 4 is a partly cross-sectional view showing separately one of the elements seen in Figures 2 and 3, the partial section being taken on a plane 90° removed from the plane of section of Figure 2.
Figure 5:
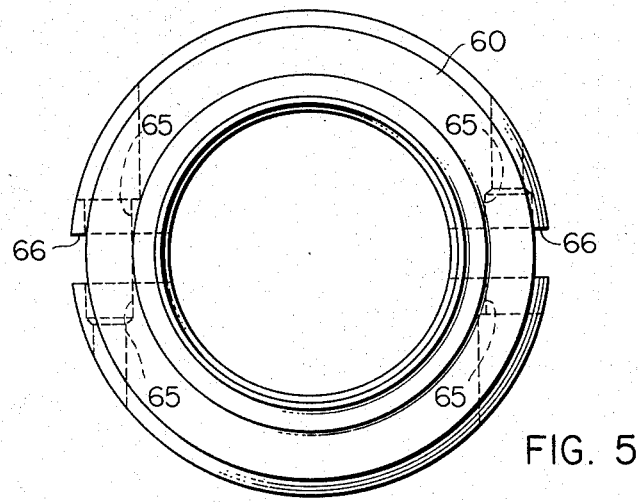
Figure 5 is an end view taken from the left-hand end of Figure 4.
Figure 6:
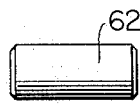
Figure 6 is a detail view of one of the journal pins employed in the illustrated examples of the invention.

The pinion-carrying member 60 is shown separately in Figures 4 and 5 with the journal pins 62 and pinions 63 removed therefrom. The pins 62 are press-fitted into the intermediate bores 65 and extend across the slots 66 in which the pinions 63 are positioned. One of the journal pins 62 is also shown separately in Figure 6.

Between the sleeve 50 and the pinion-carrying member 60 is a slip coupling which couples the sleeve 50 and pinion-carrying member 60 for stroking movement together but for disassociated relationship with respect to rotative movement. In the illustrated example, the slip coupling comprises a ball bearing generally indicated by the reference numeral 55. The inner race 56 of the bearing 55 is fixed or coupled to the lower portion of the pinion-carrying member 60, as shown. The outer race of the bearing 55 is coupled to the upper portion of the sleeve 50 by the snap ring 57.

If it is desired to shift the member 35 vertically from the position shown in the drawings, the position of the casting 40 on the column 10 may be adjusted. This adjustment will traverse the bearing balls 51 unless the quill and spindle are stroked to compensate for the adjustment. In any event, a degree of adjustment of the position of the pinion-carrying member 60 may be accommodated by temporarily loosening the collar clamp 26.

The pinion-carrying member 60 is caused to float in a slowly rotating motion by the vestige of torque transmitted through the slip coupling 55 due to the lack of the complete absence of friction therein, such motion being lightly resisted by the slight frictional engagement of the sealing rings 34 and 61. Accordingly, the pinions 63 may slowly shift around the annular extent of the racks 30 and 31. However, the racks 30 and 31 need not comprise annularly extending teeth in all cases. In one aspect, the invention contemplates the keying of the pinion-carrying member against rotation and the provision of axially extending racks on both the quill 25 and the outer race or casing member 35, which racks are relatively narrow and do not comprise teeth which extend annularly around the structure.

As previously mentioned, adjustment of the quill may be accomplished by manipulation of the hand feed lever 15 and by customary power feeds, the quill portion 25 being stroked thereby.

Figure 8:
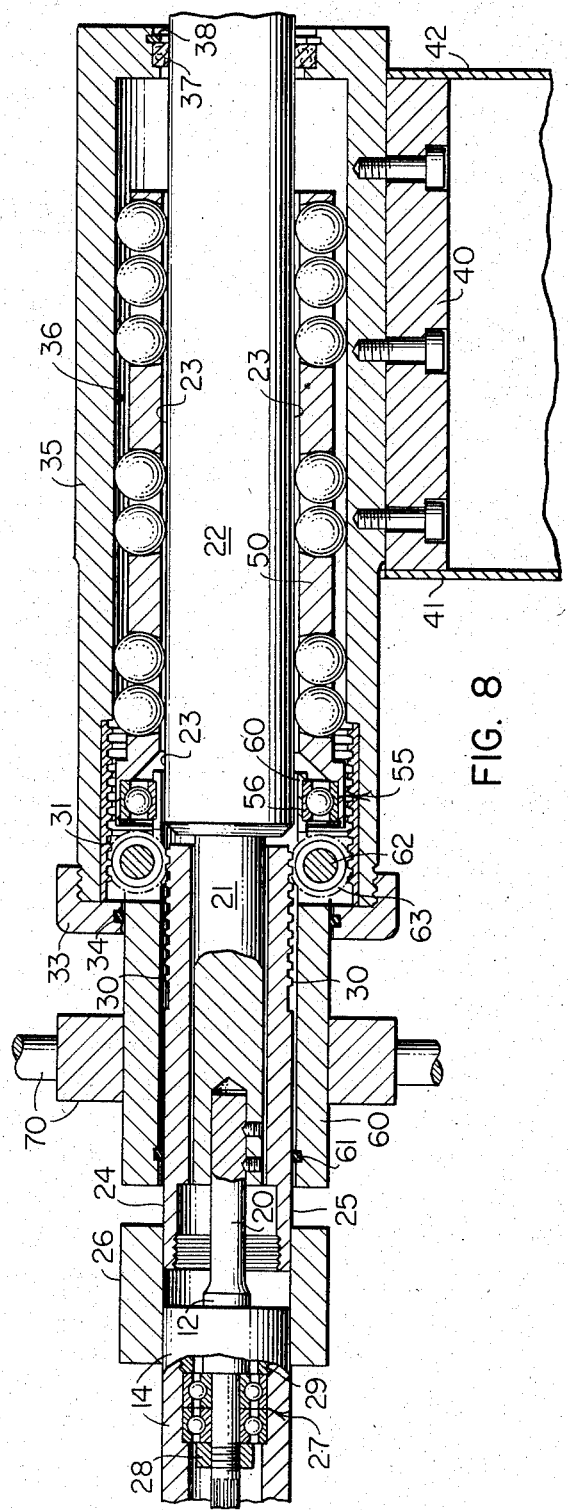
Figure 8 is a view similar to Figure 2 showing the additional handle clamp attached to the apparatus.
Figure 7:
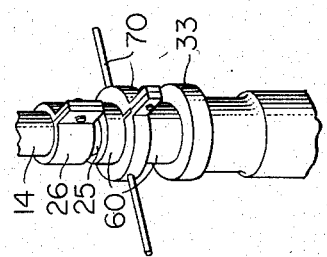
Figure 7 is a view of the central portion of the view shown in Figure 1, with an additional handle member or handled clamp attached thereto.

It will be understood that a motion multiplying effect for the stroking motion of the quill may be accomplished by directly stroking the pinion-carrying member, as by a handled clamp 70 which is clamped onto the pinion-carrying member 60 as shown in Figures 7 and 8. Since the mechanical linkage is such as to cause the pinion-carrying member 60 to stroke at half the rate of the spindle 21, 22 and quill 25, each inch of vertical or stroking movement of the clamp 70 and pinion-carrying member 60 will cause the quill 25 and spindle 21, 22 to move two inches.

Figures 9, 10:
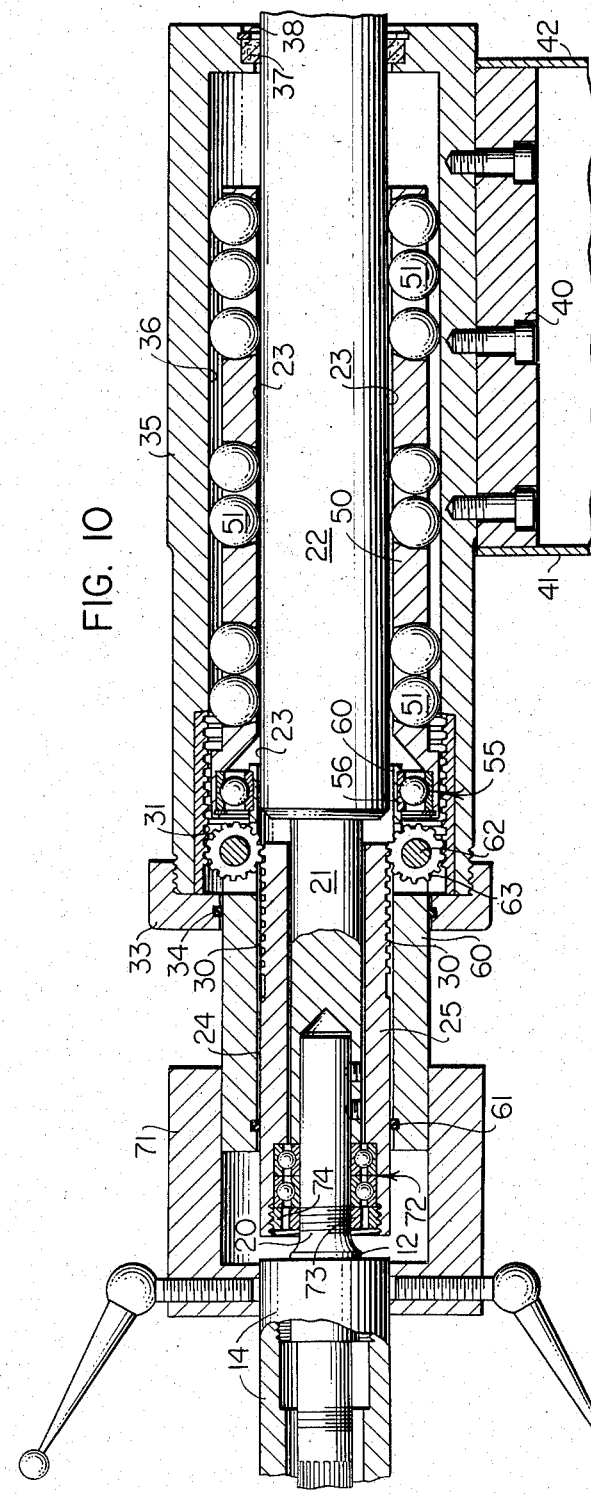
Figure 9 is a view of the central portion of the view shown in Figure 1 when the apparatus shown therein has been assembled in a slightly variant manner.
Figure 10 is a view similar to Figures 2 and 8 but showing the variant manner of assembling the apparatus.

Of course a motion multiplying arrangement where stroking is accomplished manually and directly such as by the handle 70 would in practice be replaced by a more convenient arrangement. For example, it may be desirable to convert the upper quill portion 14 into a stroking drive member for the pinion-carrying member 60, so that the true quill portion (that is, the portion of the structure which is coupled to the spindle for stroking movement together wtih the spindle) is reduced to the quill member 25, the "quill" head 13 and upper "quill" portion 14 together with a collar clamp 71 (which replaces the collar clamp 26) becoming merely the functional equivalent of the handled clamp 70. To accomplish this, the machine is assembled without the bearing 27 but with the bearing 72 which is held in place by a bearing nut 73 and clamping sleeve 74 threadedly associated with the spindle 12 and quill 25, respectively, as shown in Figures 9 and 10. Also, as just mentioned, the collar clamp 26 is omitted and instead the collar clamp 71 is employed to couple the pinion-carrying member 60 (rather than the quill 25) to the member 14. In this arrangement, for each inch of movement of the member 14, the true quill 25 and the spindle will move two inches.

Since in the arrangement shown in Figures 9 and 10 the quill portion 25 is not positively held against rotation (being no longer engaged by the clamp 26 of the earlier figures, the clamp 26 having been replaced by the clamp 71), it may be caused to rotate in a slowly rotating motion by the vestige of torque transmitted through the bearing 72 due to the lack of the complete absence of friction therein, such motion being lightly resisted by the slight frictional engagement of the sealing ring 61. Accordingly, the rack 30 may slowly shift annularly. However the quill portion 25 may be keyed against rotation if desired. In fact the racks 30 and 31 with their annularly extending teeth may be replaced with axially extending racks on both the quill 25 and the outer race or casing member 35, which racks are relatively narrow and do not comprise teeth which extend annularly around the structure.

The balls 51 and related parts may be dimensioned to provide a preloading of from 1 in 2,500 to 1 in 1,000 or even more, expressed in terms of the ratio of compressive strain to ball diameter. Such prestressing has heretofore been best avoided in machines of the above-mentioned class of apparatus to which the invention pertains. However, machines embodying the present invention have been found to successfully operate indefinitely even under such preloading.

The action of the invention in minimizing the effect of pinion and rack wear on the maintaining of true rolling action is not clearly understood. In fact, the effect of pinion and rack wear on the maintaining of true rolling action is itself not clearly understood because it would appear that the drive ratio could not be affected by mere tooth wear. Nevertheless, it has been empirically determined that in prior art devices, such as that disclosed in United States Patent 2,655,414, preloading of the sleeve-retained balls is best avoided, while in the present case the sleeve bearing stands up indefinitely under a significant amount of preloading.

The illustrated examples of the invention will suggest variations to those familar with machine tool design. Accordingly, the scope of the invention is not to be limited to all the specific details of the illustrated example but is to be defined by the following claims.

What is claimed is:

1. In a machine tool, a stroking rotating spindle, non-rotating quill means for stroking the spindle, a ball retainer sleeve surrounding the spindle, a plurality of balls supported in the sleeve and engaging the spindle, a bored member surrounding the ball retainer sleeve and comprising an outer race for said plurality of balls, a pinion-carrying member, slip coupling means for coupling the ball retainer sleeve and the pinion-carrying member for stroking movement together but for disassociated relationship with respect to rotative movement, first axially extending rack means in fixed association with the quill means, second axially extending rack means in fixed association with the bored member, and at least two pinions journaled on the pinion-carrying member on diametrically opposed portions thereof, said pinions each being operatively engaged with said first and second rack means whereby there is achieved at least partial neutralization of the effect of pinion and rack wear on the maintaining of true rolling action of said plurality of balls during stroking.

2. In a machine tool, a stroking rotating spindle, non-rotating quill means for stroking the spindle, a ball retainer sleeve surrounding the spindle, a plurality of balls supported in the sleeve and engaging the spindle, a bored member surrounding the ball retainer sleeve and comprising an outer race for said plurality of balls, a pinion-carrying member, slip coupling means for coupling the ball retainer sleeve and the pinion-carrying member for stroking movement together but for disassociated relationship with respect to rotative movement, first axially extending rack means in fixed association with the quill means, second axially extending rack means in fixed association with the bored member, and pinion means journaled on the pinion-carrying member and operatively engaged with said first and second axially extending rack means, said first and second axially extending rack means each comprising a series of annularly extending teeth, said pinion-carrying member being mounted for floating rotative movement whereby said pinion means engages said first and second rack means at various locations around the annular extents of said rack teeth.

3. In a machine tool, a stroking rotating spindle, non-rotating quill means for stroking the spindle, a ball retainer sleeve surrounding the spindle, a plurality of balls supported in the sleeve and engaging the spindle, a bored member surrounding the ball retainer sleeve and comprising an outer race for said plurality of balls, a pinion-carrying member, slip coupling means for coupling the ball retainer sleeve and the pinion-carrying member for stroking movement together but for disassociated relationship with respect to rotative movement, first axially extending rack means in fixed association with the quill means, second axially extending rack means in fixed but removable association with the bored member, pinion means journaled on the pinion-carrying member and operatively engaged with said first and second axially extending rack means, said first and second axially extending rack means each comprising a series of annularly extending teeth, said pinion-carrying member being mounted for floating rotative movement whereby said pinion means engages said first and second rack means at various locations around the annular extents of said rack teeth, said second axially extending rack means being formed as a sleeve affixable to and removable from said bored member.

4. In a machine tool, a stroking rotating spindle, non-rotating quill means for stroking the spindle, a ball retainer sleeve surrounding the spindle, a plurality of balls supported in the sleeve and engaging the spindle, a bored member surrounding the ball retainer sleeve and comprising an outer race for said plurality of balls, a pinion-carrying member, slip coupling means for coupling the ball retainer sleeve and the pinion-carrying member for stroking movement together but for disassociated relationship with respect to rotative movement, first axially extending rack means in fixed association with the quill means, second axially extending rack means in fixed association with the bored member, and pinion means journaled on the pinion-carrying member and operatively engaged with said first and second rack means.

5. In a machine tool, a stroking rotating spindle, quill means for stroking the spindle, means coupling the quill means and the spindle for stroking movement together but for disassociated relationship with respect to rotative movement, a ball retainer sleeve surrounding the spindle, a plurality of balls supported in the sleeve and engaging the spindle, a bored member surrounding the ball retainer sleeve and comprising an outer race for said plurality of balls, a pinion-carrying member, slip coupling means for coupling the ball retainer sleeve and the pinion-carrying member for stroking movement together but for disassociated relationship with respect to rotative movement, first axially extending rack means in fixed association with the quill means, second axially extending rack means in fixed association with the bored member, and pinion means journaled on the pinion-carrying member and operatively engaged with said first and second rack means.

6. In a machine tool, a stroking rotating spingle, quill means for stroking the spindle, means coupling the quill means and the spindle for stroking movement together but for disassociated relationship with respect to rotative movement, a ball retainer sleeve surrounding the spindle, a plurality of balls supported in the sleeve and engaging the spindle, a bored member surrounding the ball retainer sleeve and comprising an outer race for said plurality of balls, a pinion-carrying member, slip coupling means for coupling the ball retainer sleeve and the pinion-carrying member for stroking movement together but for disassociated relationship with respect to rotative movement, first axially extending rack means in fixed association with the quill means, second axially extending rack means in fixed association with the bored member, and pinion means journaled on the pinion-carrying member and operatively engaged with said first and second rack means, said first axially extending rack means comprising a series of annularly extending teeth, said quill means being mounted for floating rotative movement whereby said pinion means engages said first rack means at various locations around the annular extents of said rack teeth.

References Cited in the file of this patent

UNITED STATES PATENTS

| | | |
|---|---|---|
| 2,607,636 | Michelsen | Apr. 19, 1952 |
| 2,655,414 | Briney | Oct. 13, 1953 |
| 2,810,062 | Haunitz | Oct. 15, 1957 |

FOREIGN PATENTS

| | | |
|---|---|---|
| 404,376 | Italy | June 10, 1943 |